Oct. 16, 1962 W. T. BEIERBACH ET AL 3,058,148
ADJUSTABLE HINGE FITTING FOR A SEAT WITH A MOVABLE BACK
Filed March 30, 1960 2 Sheets-Sheet 1
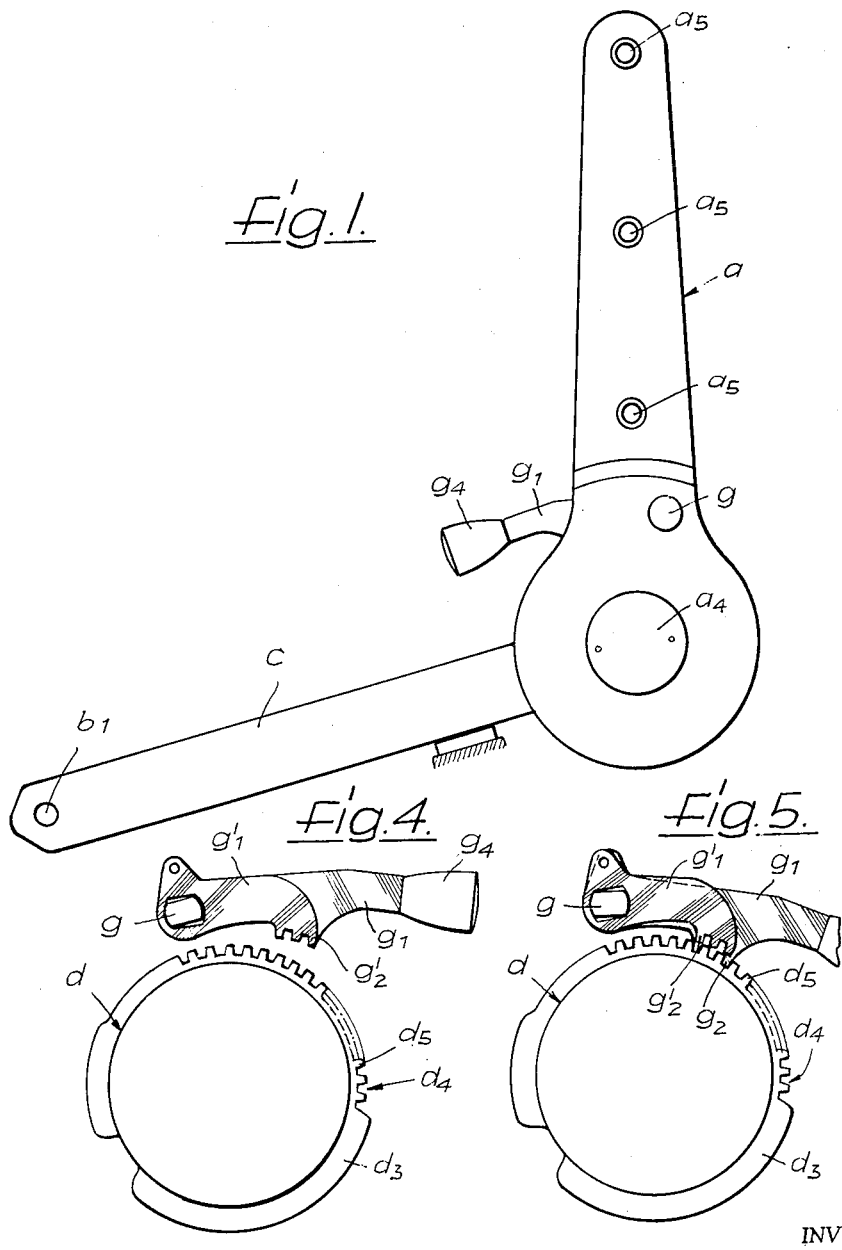
INVENTORS
WALTER BEIERBACH
SYLVESTER VON SASS
BY Watson, Cole, Grindle & Watson
ATTORNEYS

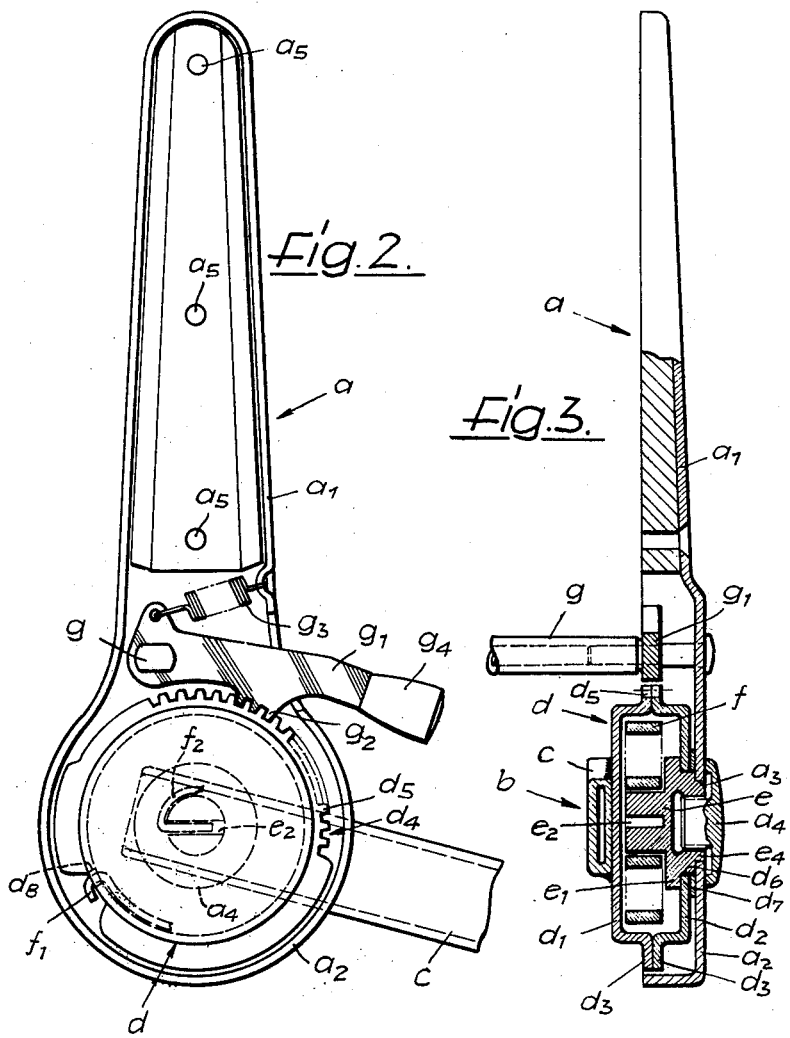

United States Patent Office

3,058,148
Patented Oct. 16, 1962

3,058,148
ADJUSTABLE HINGE FITTING FOR A SEAT
WITH A MOVABLE BACK
Walter Theodor Beierbach, Stuttgart-Weilimdorf, and Sylvester Kurt von Sass, Pludershausen, Baden-Wurttemberg, Germany, assignors to Stuttgarter Karosseriewerk Reutter & Co. G.m.b.H., Stuttgart, Germany, a corporation of Germany
Filed Mar. 30, 1960, Ser. No. 18,755
Claims priority, application Germany Mar. 1, 1960
6 Claims. (Cl. 16—146)

The present invention relates to a hinge fitting for pivotally connecting the back of a seat at both sides thereof to the seat frame, particularly of an automobile or other vehicle, and to a device combined with such a fitting for adjusting the degree of inclination of the back relative to the seat.

Such fittings are usually provided in pairs and each of them consists of two parts which are secured to the seat and to the back, respectively, and at each side thereof, and the two parts of each fitting are pivotably connected by a pin. In some hinge fittings for car seats, the two parts of the fitting have also been made adjustable to different inclined positions relative to each other by means of a gear or gear sector which is associated with one part of the fitting and a pawl which is associated with the other part and adapted to engage into the gear at different angular positions of the back relative to the seat. Such hinge fittings have sometimes also been provided with a spring acting upon both hinge parts and tending to swing the back to its erect or rearwardly inclined position.

It is the principal object of the present invention to provide a hinge fitting which is combined with an adjusting device of the general type as described above, and which has the advantage of being very easily and inexpensively produced and of taking up very little space so that it may be applied to seats of various types of construction.

This object is attained according to the invention by providing one of the two hinge members with a casing in which the spring is mounted for swinging the back to its erect or rearwardly inclined position, by making this casing of two parts, at least one of which is cup-shaped and provided with an outer flange which is secured to an outer edge portion or a similar flange on the other part, and by providing the combined outer edge portion of both parts of the casing with a set of gear teeth to form a gear rim on the casing. The more complicated of the two members of the hinge fitting is thus of extreme simplicity and may be produced very easily and inexpensively. Both parts of the casing may, for example, be of the same cylindrical cup shape and be made with the same tool, and each cup-shaped portion together with the gear rim thereon may be produced in a single operation.

The two cup-shaped parts may also be very easily secured to each other along their flanged edges, and the pivot pin which connects the two hinge members may also be very easily connected to the casing by rotatably mounting it in a central bore in one part of the casing and providing it with a collar which engages with the inner side of the edge portion which defines the bore.

It is also very easy to attain the desired effect of the retracting spring by inserting one end thereof into an aperture in the casing and the other end into an aperture in the pivot pin, and by securing the pivot pin rigidly to the other hinge member.

It is also possible to provide a ring of a very solid material between the adjacent edges of the two casing parts so that the gear rim will thus be widened and reinforced.

A further feature of the invention consists in providing the other hinge member which carries the pawl with an upwardly drawn edge and in making the end thereof which is connected to the casing in the form of a cup which surrounds the casing. This permits the production also of this hinge member by a single, very simple operation. The upwardly drawn edge of this hinge member increases the stability thereof and it also serves as an outer covering of the gear rim and as a housing of the pawl.

Hinge fittings of this general type are usually mounted on each side of a seat and it is also known to connect the spring-loaded pawls of both hinge fittings by means of a rod. Such a connecting rod is also used for connecting the pawls of the hinge fittings according to the present invention, but it is an additional feature thereof to connect one of the pawls to this connecting rod with a certain amount of play so that it will drag slightly behind in its operation relative to the other pawl. This has the advantage that, while both pawls when withdrawn will disengage from both gear rims simultaneously, one pawl will be able to engage with its associated gear rim slightly later than the other if, because of the resilience of the seat, both pawls might not simultaneously coincide exactly with the tooth spaces of their associated gear rims.

These and other objects, features, and advantages of the present invention will become further apparent from the following detailed description thereof, particularly when read with reference to the accompanying drawings, in which—

FIGURES 1 and 2 shows front and rear views of one embodiment of the hinge fitting according to the invention;

FIGURE 3 shows, partly in cross section, a side view thereof; while

FIGURES 4 and 5 show detail views of a part of FIGURE 2, namely, the casing and the pawls in the disengaged and engaged positions, respectively.

The hinge fitting and adjusting device according to the invention as illustrated in the drawings consists of two arms $a$ and $b$. Arm $a$ is intended to be secured to the folding back of a vehicle seat by means of screws which are inserted into bores $a_5$, while arm $b$ is intended to be secured to the seat by means of a screw which is inserted into a bore $h_1$, and serves as the swivel axis for tilting the back forwardly.

Arm $b$ consists of an arm portion $c$ and a casing $d$. Casing $d$ consists of two cup-shaped parts $d_1$ and $d_2$, each of which is provided with an outwardly flanged edge portion $d_3$. These two flanges $d_3$ are preferably permanently secured to each other, for example, by welding, although they may also be removably secured to each other by screws or the like. The outer edge of casing $d$ which is formed by flanges $d_3$ is provided along a part of its circumference with a set $d_4$ of gear teeth $d_5$ with straight flanks.

One part $d_2$ of casing $d$ is provided with a central bore $d_6$ into which one end of a pivot bolt $e$ is inserted which has a collar $e_1$ which engages with the inner side of an annular edge $d_7$ of casing part $d_2$ which defines bore $d_6$.

At the inside of casing $d$, a spiral spring $f$ is provided, the outer end $f_1$ of which is hooked into an aperture $d_8$ in casing $d$, as shown in FIGURE 2, and the inner end $f_2$ of which engages into a slot $e_2$ in the pivot bolt $e$.

Pivot bolt $e$ and spring $f$ are inserted into the casing part $d_2$ before the latter is connected to the other casing part $d_1$.

Arm portion $c$ is rigidly secured to casing part $d_1$, for example, by welding, and it is preferably made of a tubular structure and of a shape so as to permit the hinge fitting to be mounted on any type of seat.

The main arm $a$ of the device is provided with a raised edge $a_1$, and its end which is connected to pivot bolt $e$ forms a cup-shaped member $a_2$ which surrounds the outer edge $d_3$ of casing $d$. Arm $a$ is rigidly secured to pivot bolt $e$ by means of a screw $a_4$. In order to prevent any relative rotation between arm $a$ and bolt $e$, arm $a$ may be provided with a noncircular aperture $a_3$ and the end $e_4$ of bolt $e$ which fits into the aperture may be made of a corresponding shape.

The arms $a$ of two corresponding hinge fittings which are mounted at the two sides of the seat are connected by a rod $g$ which carries on each end a pawl $g_1$ with teeth $g_2$, and each pawl $g_1$ is urged by a spring $g_3$ toward casing $d$ and into locking engagement between the pawl teeth $g_2$ and the casing teeth $d_5$. At least one of the two pawls $g_1$ at the opposite ends of rod $g$ is further provided with a handle $g_4$.

One of the two pawls on the opposite ends of rod $g$ which is shown in the drawings as being made without a handle, namely, pawl $g'_1$, is connected to rod $g$ with a certain amount of play, as shown particularly in FIGURE 5. This play is made of such a size that, when pawl $g_1$ is being disengaged, the other pawl $g'_1$ will also be immediately disengaged because of the connection between the two pawls by rod $g$ and the action of spring $g_3$ on pawl $g'_1$. If, however, handle $g_4$ on pawl $g_1$ is released and the teeth $g_2$ of this pawl engage between the teeth $d_5$ of gear rim $d_4$, the edges of the teeth of pawl $g'_1$ may at first rest on the edges of teeth $d_5$ before they will engage between teeth $d_5$ if, for example, by a slight shaking of the back of the seat, these teeth of pawl $g'_1$ will be shifted so as to coincide exactly with the tooth spaces below and will then be forced into these tooth spaces by the pressure of spring $g_3$ of this pawl.

By making one end of arm $b$ in the form of a closed casing and by making the arm portion $c$ of a tubular structure, the adjusting device is given a great torsional rigidity which is especially of importance if the seat and back frames differ considerably in width and the hinge fitting will therefore be subjected not only to bending but also to twisting stresses.

Pawl $g_1$ may be made of a single stamped piece of material. The angle of the flanks of teeth $d_5$ and $g_2$ is preferably made substantially equal to or smaller than the friction angle so that a self-locking effect will be attained and additional locking means will not be necessary.

The two casing parts are preferably made of a material permitting at least the flanges forming the gear teeth $d_5$ to be hardened. Either in addition to such hardened gear teeth $d_5$ or in place thereof, one or more rings of steel or other hard material with outer gear teeth thereon may be inserted between the flanges $d_3$. If these flanges $d_3$ are likewise provided with gear teeth, the hardened gear ring between them will reinforce the softer teeth $d_5$ and make them of a greater width.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention what we claim is:

1. A pair of hinge fittings for adjusting the back of a seat to different inclined positions, each of said hinge fittings comprising two hinge members adapted to be secured to the seat and to the back, respectively, the first of said hinge members forming a fully enclosed casing comprising two circular parts secured to each other, at least one of said circular parts being cup-shaped, said casing having an arcuate flange at the periphery thereof, said flange having outwardly projecting gear teeth thereon, one of said parts having a central aperture therein, a pivot pin secured to the second hinge member and rotatably mounted within and guided by the wall of said aperture and thus closing said aperture, a spiral spring within said casing having two ends connected to said casing and to said pivot pin, respectively, and tending to pivot said two hinge members relative to each other for pivoting the back to an erect or rearwardly inclined position relative to the seat when said spring is under stress, a pawl pivotably secured to said second-mentioned hinge member, and a spring connected to said pawl and tending to pivot the same into locking engagement with said gear teeth for adjustably securing said two hinge members at different angles to each other, said hinge fittings being adapted to be secured to the opposite sides of said seat and back, and a rod rigidly connected to the pawl on one of said hinge fittings and adapted to be connected to the pawl of the other hinge fitting with a certain amount of play.

2. A hinge fitting for adjusting the back of a seat to different inclined positions comprising two hinge members adapted to be secured to the seat and to the back, respectively, the first of said hinge members forming a fully enclosed casing comprising two circular parts secured to each other, at least one of said circular parts being cup-shaped, said casing having an arcuate flange at the periphery thereof, said flange having outwardly projecting gear teeth thereon, one of said parts having a central aperture therein, a pivot pin secured to the second hinge member and rotatably mounted within and guided by the wall of said aperture and thus closing said aperture, a spiral spring within said casing having two ends connected to said casing and to said pivot pin, respectively, and tending to pivot said two hinge members relative to each other for pivoting the back to an erect or rearwardly inclined position relative to the seat when said spring is under stress, a pawl pivotably secured to said second-mentioned hinge member, and a spring connected to said pawl and tending to pivot the same into locking engagement with said gear teeth for adjustably securing said two hinge members at different angles to each other.

3. A pair of hinge fittings for adjusting the back of a seat to different inclined positions, each of said hinge fittings comprising two hinge members adapted to be secured to the seat and to the back, respectively, the first of said hinge members forming a fully enclosed casing comprising two circular parts secured to each other, at least one of said circular parts being cup-shaped, said casing having an arcuate flange at the periphery thereof, said flange having outwardly projecting gear teeth thereon, one of said parts having a central aperture therein, a pivot pin secured to the second hinge member and rotatably mounted within and guided by the wall of said aperture and thus closing said aperture, a spiral spring within said casing having two ends connected to said casing and to said pivot pin, respectively, and tending to pivot said two hinge members relative to each other for pivoting the back to an erect or rearwardly inclined position relative to the seat when said spring is under stress, a pawl pivotably secured to said second-mentioned hinge member, and a spring connected to said pawl and tending to pivot the same into locking engagement with said gear teeth for adjustably securing said two hinge members at different angles to each other, said arcuate flange being integral with one of said circular parts and secured to said other circular part, and said gear teeth being provided in the peripheral edge portion of said flange.

4. A pair of hinge fittings for adjusting the back of a seat to different inclined positions, each of said hinge fittings comprising two hinge members adapted to be secured to the seat and to the back, respectively, the first of said hinge members forming a fully enclosed casing comprising two circular parts secured to each other, at least one of said circular parts being cup-shaped, said casing having an arcuate flange at the periphery thereof, said flange having outwardly projecting gear teeth thereon, one of said parts having a central aperture therein, a pivot pin secured to the second hinge member and rotatably mounted within and guided by the wall of said aperture and thus closing said aperture, a spiral spring within said casing having two ends connected to said casing and to said pivot pin, respectively, and tending to pivot said two hinge members relative to each other for pivoting the back to an erect or rearwardly inclined position relative to the seat when said spring is under stress, a pawl pivotably secured to said second-mentioned hinge member, and a spring connected to said pawl and tending to pivot the same into locking engagement with said gear teeth for adjustably securing said two hinge members at different angles to each other, said pawl consisting of a single element comprising a lever pivotably mounted on said second hinge member, and a plurality of gear teeth on said lever adapted under the action of said pawl spring to engage into the gear teeth on said arcuate flange, said lever having an extension projecting to the outside of said second hinge member and serving as a handle for disengaging said gear teeth on said lever from said gear teeth on said arcuate flange.

5. A pair of hinge fittings for adjusting the back of a seat to different inclined positions, each of said hinge fittings comprising two hinge members adapted to be secured to the seat and to the back, respectively, the first of said hinge members forming a fully enclosed casing comprising two circular parts secured to each other, at least one of said circular parts being cup-shaped, said casing having an arcuate flange at the periphery thereof, said flange having outwardly projecting gear teeth thereon, one of said parts having a central aperture therein, a pivot pin secured to the second hinge member and rotatably mounted within and guided by the wall of said aperture and thus closing said aperture, a spiral spring within said casing having two ends connected to said casing and to said pivot pin, respectively, and tending to pivot said two hinge members relative to each other for pivoting the back to an erect or rearwardly inclined position relative to the seat when said spring is under stress, a pawl pivotably secured to said second-mentioned hinge member, and a spring connected to said pawl and tending to pivot the same into locking engagement with said gear teeth for adjustably securing said two hinge members at different angles to each other, said second hinge member carrying said pawl having a raised portion along at least a part of its outer edges near the end of said second hinge member secured to said pivot pin, and said raised edge portion forming a cup-shaped part substantially surrounding said casing including said arcuate flange and said gear teeth thereon.

6. A hinge fitting for adjusting the back of a seat to different inclined positions comprising two hinge members adapted to be secured to the seat and to the back, respectively, the first of said hinge members forming a fully enclosed casing comprising two circular parts secured to each other, both of said circular parts being cup-shaped, and having an arcuate flange at the periphery thereof, said flange having outwardly projecting gear teeth thereon, one of said parts having a central aperture therein, a pivot pin secured to the second hinge member and rotatably mounted within and guided by the wall of said aperture and thus closing said aperture, a spiral spring within said casing having two ends connected to said casing and to said pivot pin, respectively, and tending to pivot said two hinge members relative to each other for pivoting the back to an erect or rearwardly inclined position relative to the seat when said spring is under stress, a pawl pivotably secured to said second-mentioned hinge member, and a spring connected to said pawl and tending to pivot the same into locking engagement with said gear teeth for adjustably securing said two hinge members at different angles to each other.

References Cited in the file of this patent

UNITED STATES PATENTS

| Re. 24,528 | Borisch | Sept. 2, 1958 |
| 2,784,770 | Herr | Mar. 12, 1957 |

FOREIGN PATENTS

| 881,099 | Germany | June 29, 1953 |
| 1,100,938 | France | Apr. 13, 1955 |